(12) United States Patent
Weldon et al.

(10) Patent No.: US 12,403,968 B2
(45) Date of Patent: Sep. 2, 2025

(54) VEHICLES INCLUDING TRUCK ASSEMBLIES CONFIGURED TO SELECTIVELY DECOUPLE A WHEEL OF THE TRUCK ASSEMBLY

(71) Applicant: Volley Automation, Inc., Denver, CO (US)

(72) Inventors: David Edwin Weldon, Gilroy, CA (US); Connor James Anderson, Alameda, CA (US)

(73) Assignee: Volley Automation, Inc., Denver, CO (US)

( * ) Notice: Subject to any disclaimer, the term of this patent is extended or adjusted under 35 U.S.C. 154(b) by 850 days.

(21) Appl. No.: 17/687,951

(22) Filed: Mar. 7, 2022

(65) Prior Publication Data

US 2023/0278652 A1    Sep. 7, 2023

(51) Int. Cl.
| | | |
|---|---|---|
| *B62D 63/04* | (2006.01) | |
| *B60B 19/00* | (2006.01) | |
| *B60K 17/02* | (2006.01) | |
| *B62D 57/00* | (2006.01) | |
| *B62D 33/02* | (2006.01) | |

(52) U.S. Cl.
CPC ............ *B62D 63/04* (2013.01); *B60B 19/003* (2013.01); *B60K 17/02* (2013.01); *B62D 57/00* (2013.01); *B62D 33/02* (2013.01)

(58) Field of Classification Search
CPC ........ B62D 63/04; B62D 57/00; B62D 33/02; B60B 19/003; B60K 17/02
See application file for complete search history.

(56) References Cited

U.S. PATENT DOCUMENTS

| | | | | |
|---|---|---|---|---|
| 2,397,673 A | * | 4/1946 | Lewis | ................... F16H 48/145 |
| | | | | 180/24.03 |
| 5,551,349 A | * | 9/1996 | Bodzin | ................. B60B 19/125 |
| | | | | 301/5.23 |
| 6,527,073 B1 | * | 3/2003 | Bowman | ................ B60K 17/36 |
| | | | | 180/24.03 |

(Continued)

FOREIGN PATENT DOCUMENTS

| | | |
|---|---|---|
| CN | 206938910 U | 1/2018 |
| CN | 106348202 B | 6/2018 |

(Continued)

OTHER PUBLICATIONS

Machine translation of EP 2159073 (Minnecker Mar. 3, 2010) from https://worldwide.espacenet.com/ (Year: 2010).*

(Continued)

*Primary Examiner* — Valentin Neacsu
*Assistant Examiner* — Michael R Stabley
(74) *Attorney, Agent, or Firm* — Dinsmore & Shohl LLP

(57) ABSTRACT

A vehicle including a plurality of truck assemblies is provided. Each truck assembly includes a truck axle, a first wheel fixed to the truck axle, a second wheel selectively coupled to the truck axle, a motor configured to rotate the truck axle, and a clutch operatively coupled to the second wheel. The clutch is positionable between a coupled position and a decoupled position. When the clutch is in the coupled position, the second wheel rotates with the truck axle, and when the clutch is in the decoupled position, the second wheel is free to rotate relative to the truck axle.

13 Claims, 6 Drawing Sheets

(56) References Cited

U.S. PATENT DOCUMENTS

| | | | | |
|---|---|---|---|---|
| 7,980,335 | B2* | 7/2011 | Potter | B60B 19/125 |
| | | | | 180/7.1 |
| 9,216,612 | B2* | 12/2015 | Zdrahal | B60B 19/003 |
| 9,890,024 | B2* | 2/2018 | Hao | B66F 9/065 |
| 11,054,209 | B2* | 7/2021 | Chen | F41A 23/30 |
| 11,446,960 | B2* | 9/2022 | Galang | B60B 35/14 |
| 11,597,638 | B2* | 3/2023 | Puszkiewicz | B66F 17/006 |
| 11,794,831 | B2* | 10/2023 | Beiler | B60K 17/356 |
| 2008/0176698 | A1* | 7/2008 | Moreno Pujal | B60K 17/046 |
| | | | | 475/5 |
| 2014/0232174 | A1* | 8/2014 | Zdrahal | B60B 19/003 |
| | | | | 301/5.23 |
| 2020/0317486 | A1* | 10/2020 | Puszkiewicz | B66F 9/07586 |
| 2021/0001937 | A1* | 1/2021 | Beiler | B60G 11/225 |
| 2021/0008945 | A1* | 1/2021 | Perrin | E02F 9/028 |
| 2023/0356554 | A1* | 11/2023 | Murray | A01D 41/1226 |

FOREIGN PATENT DOCUMENTS

| | | |
|---|---|---|
| CN | 108583733 A | 9/2018 |
| CN | 213037353 U | 4/2021 |
| CN | 109969713 A | 8/2021 |
| CN | 112918184 A | 8/2021 |
| CN | 115476921 A | 12/2022 |
| DE | 102011053903 A1 | 3/2013 |
| EP | 1145894 A2 | 10/2001 |
| EP | 1946953 A1 | 7/2008 |
| EP | 2159073 A2 | 3/2010 |
| JP | 2003261295 A | 9/2003 |

OTHER PUBLICATIONS

International Search Report and Written Opinion pertaining to Application No. PCT/US2023/014216 dated Nov. 14, 2023, 17 pages.

\* cited by examiner

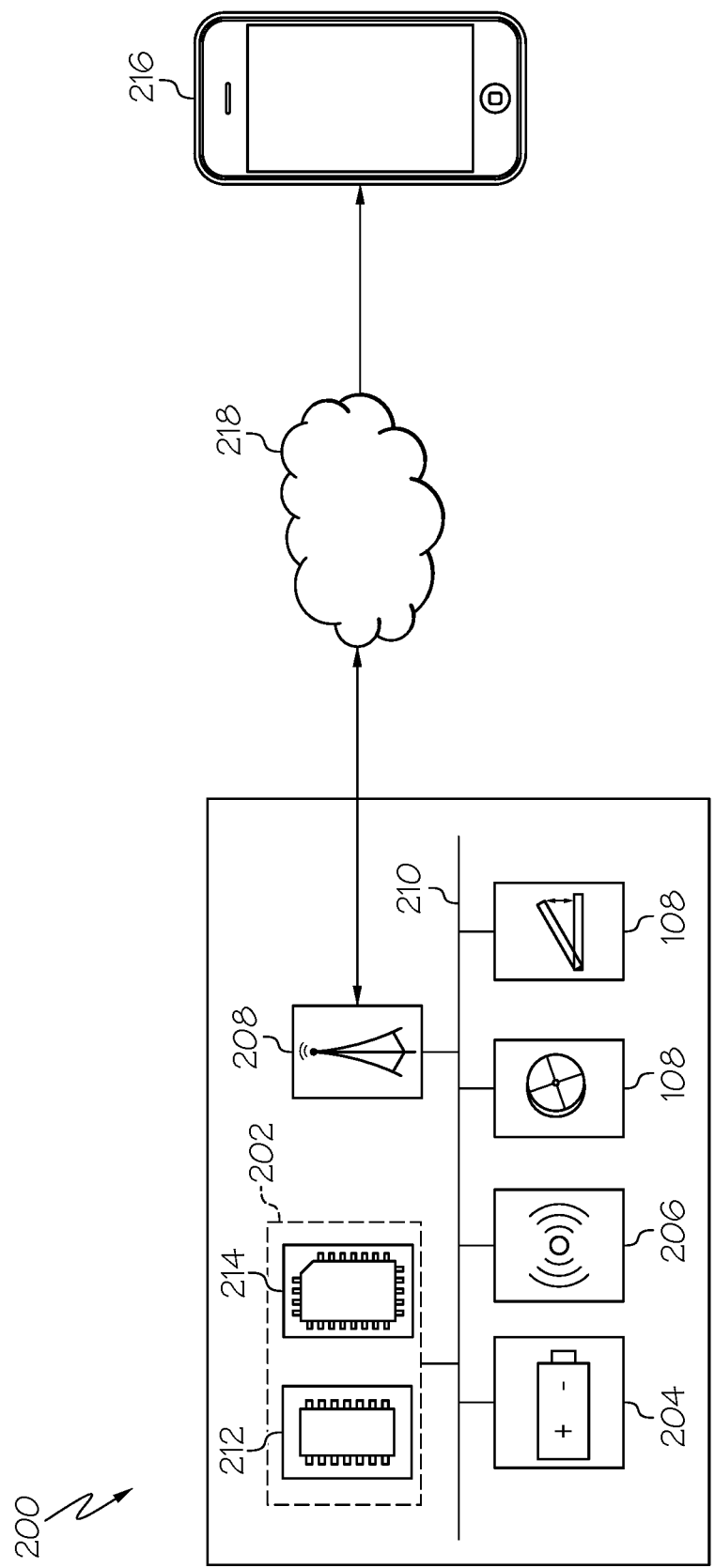

VEHICLES INCLUDING TRUCK ASSEMBLIES CONFIGURED TO SELECTIVELY DECOUPLE A WHEEL OF THE TRUCK ASSEMBLY

TECHNICAL FIELD

The present specification generally relates to vehicles for transporting a load and, more specifically, omnidirectional vehicles for including omnidirectional wheels.

BACKGROUND

Omnidirectional vehicles including omnidirectional wheels such as, for example, Mecanum wheels, are capable of moving in directions other than just a forward vehicle longitudinal direction and a rearward vehicle longitudinal direction. Specifically, omnidirectional vehicles are capable of rotating about a central point of the vehicle, moving in a sideways vehicle lateral direction, and moving in a diagonal direction by independently controlling the direction of rotation of the omnidirectional wheels of the vehicle.

SUMMARY

In one embodiment, a vehicle includes a plurality of truck assemblies. Each truck assembly includes: a truck axle; a first wheel fixed to the truck axle; a second wheel selectively coupled to the truck axle; a motor configured to rotate the truck axle; and a clutch operatively coupled to the second wheel, the clutch being positionable between a coupled position and a decoupled position, wherein when the clutch is in the coupled position, the second wheel rotates with the truck axle, and when the clutch is in the decoupled position, the second wheel is free to rotate relative to the truck axle.

In another embodiment, a vehicle includes: a frame; a front yoke fixed to the frame; a rear yoke rotatably coupled to the frame and rotatable about a vehicle longitudinal axis; and a truck assembly rotatably coupled to opposite ends of each of the front yoke and the rear yoke, the truck assembly including: a truck axle; a first wheel fixed to the truck axle, the first wheel being an omnidirectional wheel; a second wheel selectively coupled to the truck axle; and a motor configured to rotate the truck axle.

In yet another embodiment, a method includes: receiving, at a vehicle, a first instruction to perform a first maneuver, the first maneuver including moving the vehicle in a vehicle longitudinal direction, the vehicle including: a plurality of truck assemblies, each truck assembly including: a truck axle; a first wheel fixed to the truck axle; a second wheel selectively coupled to the truck axle; a motor configured to rotate the truck axle; and a clutch operatively coupled to the second wheel, the clutch being positionable between a coupled position to rotate the second wheel with the truck axle, and a decoupled position to permit the truck axle to rotate without rotating the second wheel; in response to receiving the first instruction, positioning the clutch into the coupled position; performing the first maneuver; receiving, at the vehicle, a second instruction to perform a second maneuver, the second maneuver including moving the vehicle in a non-vehicle longitudinal direction; in response to receiving the second instruction, positioning the clutch into the decoupled position; and performing the second maneuver.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6 schematically depicts a diagram of a vehicle system, according to one or more embodiments shown and described herein.

DETAILED DESCRIPTION

Figure 1:
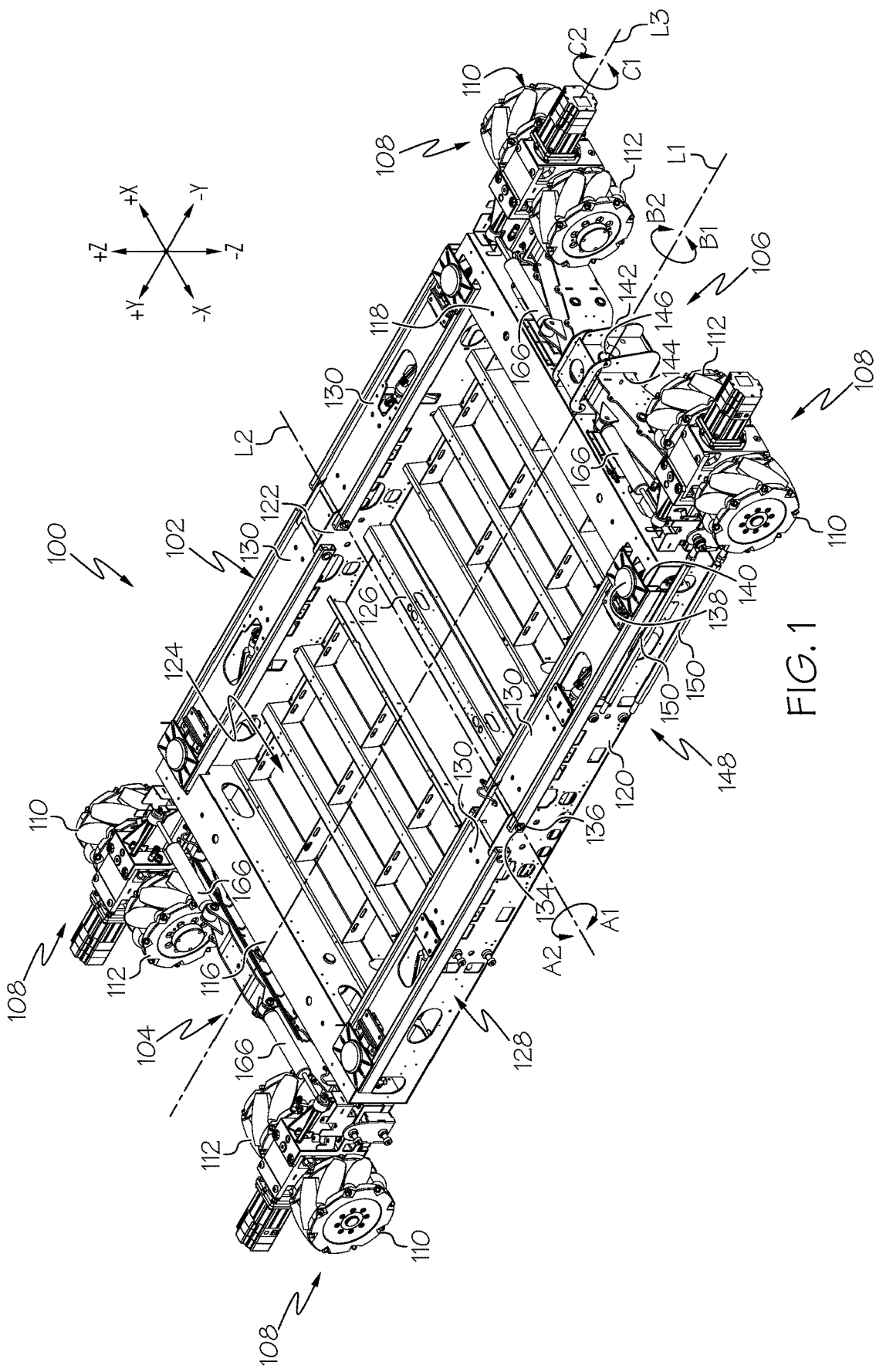
FIG. 1 schematically depicts a perspective view of a vehicle, according to one or more embodiments shown and described herein.

As noted above, omnidirectional vehicles including omnidirectional wheels are capable of moving in directions other than just a forward vehicle longitudinal direction and a rearward vehicle longitudinal direction. Specifically, omnidirectional vehicles are capable of rotating about a central point of the vehicle, moving in a sideways vehicle lateral direction, and moving in a diagonal direction by independently controlling the direction of rotation of the omnidirectional wheels of the vehicle. However, the amount of load the vehicle is configured to carry is limited by the number of omnidirectional wheels of the vehicle. Providing additional wheels increases the load carrying capacity of the vehicle, but increases the amount of friction on the wheels during movement in a non-vehicle longitudinal direction, thereby reducing the life span of the wheels. One solution to this problem is to independently adjust the rotational speed of each wheel to account for the position of each wheel on the vehicle. However, this requires each wheel to have a separate motor, which increases the weight of the vehicle and increases the potential for part failure.

Embodiments provided herein are directed to improved omnidirectional vehicles that reduce friction on the wheels of the vehicle while moving in a non-vehicle longitudinal direction without increasing the weight of the vehicle and the potential for part failure by including a designated motor for each wheel.

Embodiments described herein are directed to an omnidirectional vehicle including a plurality of truck assemblies and each truck assembly configured to selectively decouple one of a pair of wheels of the truck assembly when moving the vehicle in a non-vehicle longitudinal direction. By decoupling one of the wheels of each truck assembly, the decoupled wheel is able to freely rotate. Various embodiments of the vehicle and the operation of the vehicle are described in more detail herein. Whenever possible, the same reference numerals will be used throughout the drawings to refer to the same or like parts.

Referring now to FIG. 1, a vehicle 100 is illustrated according to one or more embodiments described herein. As described in more detail herein, the vehicle 100 is an omnidirectional land-based vehicle capable of moving in any direction by controlling the direction of rotation of individual omnidirectional wheels of the vehicle 100. As described herein, the vehicle 100 may be suitable for carrying large loads and transporting the payload across a vehicle transit surface. However, it should be appreciated that the vehicle 100 disclosed herein may be suitable for any other purpose without deviating from the scope of the present disclosure.

Referring now to FIG. 1, the vehicle 100 may generally include a frame 102, a front yoke 104, and opposite rear yoke 106 provided at opposite ends of the frame 102, and a truck assembly 108 mounted at opposite ends of each of the front yoke 104 and the rear yoke 106. Each truck assembly 108 includes a first or outer wheel 110, a second or inner wheel 112, and a motor 114 selectively coupled to at least one of the outer wheel 110 and the inner wheel 112. As used herein, the term "truck assembly" refers to an assembly generally including a pair of wheels operatively coupled to a motor to transport a vehicle. As discussed herein, a vehicle may include a plurality of truck assemblies, such as four truck assemblies, arranged at various corners, sides, or other suitable locations of the vehicle.

The frame 102 includes a front rail 116, an opposite rear rail 118, a first side rail 120, and an opposite second side rail 122 extending between the front rail 116 and the rear rail 118. The frame 102 defines an open interior 124 between the front rail 116, the rear rail 118, the first side rail 120, and the second side rail 122 in which various components of the vehicle 100 may be stowed. For example, and as discussed in more detail herein, the vehicle 100 may include one or more batteries, control systems, motors, sensors, and the like provided within the open interior 124 of the frame 102. The frame 102 of the vehicle 100 may further include a plurality of reinforcing beams 126 extending parallel to either a vehicle longitudinal axis L1 between the front rail 116 and the rear rail 118, or a vehicle lateral axis L2 between the first side rail 120 and the second side rail 122. The vehicle longitudinal axis L1 extends parallel to the +/−Y axis of the coordinate axes of the coordinate axes depicted in FIG. 1. The vehicle lateral axis L2 is transverse to the vehicle longitudinal axis L1 and extends parallel to the +/−X axis of the coordinate axes depicted in FIG. 1. The reinforcing beams 126 may be suitable for reinforcing the frame 102 and providing a surface to which the various components provided within the open interior 124 of the frame 102 may be mounted.

As described in more detail herein, the vehicle 100 includes a lifting assembly 128 for engaging an object to be transported by the vehicle 100. In embodiments, the lifting assembly 128 includes a plurality of lifting devices 130 pivotally fixed to an upper surface 132 of the frame 102, particularly the first side rail 120 and the second side rail 122. As shown in FIG. 1, the lifting assembly 128 includes a pair of lifting devices 130 pivotally fixed to the first side rail 120 at respective proximal ends thereof, and a pair of lifting devices 130 pivotally fixed to the second side rail 122 at respective proximal ends 134 thereof. However, it should be appreciated that the lifting assembly 128 may include any number of lifting devices 130 such as, for example, one lifting device 130 or more than five lifting devices 130. Additionally, although each of the lifting devices 130 are illustrated as being pivotally fixed to the first side rail 120 or the second side rail 122, it should be appreciated that the lifting devices 130 may alternatively be pivotally fixed to either the front rail 116 or the rear rail 118. Moreover, the lifting assembly 128 may include any other suitable lifting device movable in a non-pivoting motion, such as a vertically translating or elevating device mounted at any suitable location of the vehicle 100 such as, for example, within the open interior 124 of the frame 102.

Figure 4:
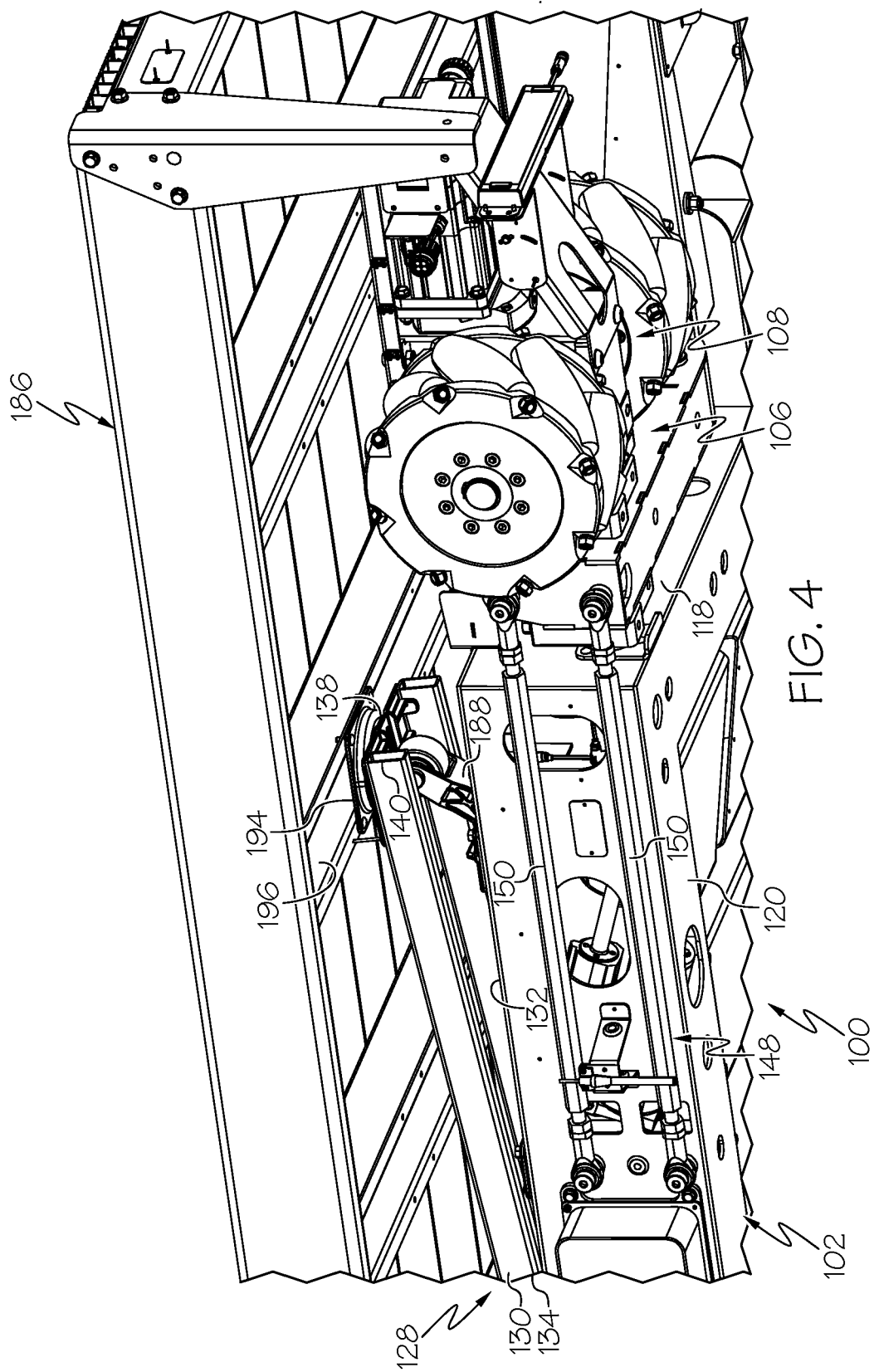
FIG. 4 schematically depicts a perspective view of the vehicle of FIG. 1 positioned under a platform with a lifting device of the vehicle in a raised position, according to one or more embodiments shown and described herein.

In the present embodiment, each lifting device 130 is pivotally coupled to the first side rail 120 or the second side rail 122 by a lifting pivot 136 extending through the proximal end 134 of the lifting device 130. The lifting device 130 may be operated by a control system to pivot about the lifting pivot 136 between a lowered position (FIG. 1) and a raised position (FIG. 4). When in the lowered position, the lifting device 130 is rotated in the direction of arrow A1 about the lifting pivot 136 such that the lifting device 130 is lowered to extend substantially parallel to the first side rail 120 and the second side rail 122. When in the raised position, the lifting device 130 is rotated in the direction of arrow A2 about the lifting pivot 136 such that the lifting device 130 is raised to contact an object to be transported such as, for example, a platform carrying a load. As described in more detail herein, the lifting device 130 may include a contact member 138 provided at a distal end 140 opposite the proximal end 134 to contact and engage the object. In embodiments, each of the lifting devices 130 may be operated such that the contact member 138 of each lifting device 130 simultaneously contacts and engages the object to be transported.

The front yoke 104 is fixedly mounted to the front rail 116 of the frame 102 of the vehicle 100 such that the front yoke 104 does not rotate in any direction. To the contrary, the rear yoke 106 is rotatably coupled to the rear rail 118 of the frame 102 of the vehicle 100. In embodiments, the frame 102 of the vehicle 100 includes a rear housing 142 fixed to the rear rail 118 and extending in a direction opposite the front rail 116. The rear housing 142 defines a housing cavity 144 through which the rear yoke 106 extends and the rear yoke 106 is rotatably fixed to the rear housing 142 by a rear yoke pivot 146 extending coaxial with the vehicle longitudinal axis L1. Accordingly, the rear yoke 106 is configured to rotate about the vehicle longitudinal axis L1 at the rear yoke pivot 146 in the direction of arrow B1 and arrow B2. As described in more detail herein, the truck assemblies 108 are rotatably coupled to the front yoke 104 and the rear yoke 106 to allow for the outer wheel 110 and the inner wheel 112 of each truck assembly 108 to move in opposite vehicle vertical directions. As such, each truck assembly 108 rotates in the direction of arrow C1 and arrow C2 about a respective truck assembly axis L3 extending parallel to the vehicle longitudinal axis L1 and the +/−Y axis of the coordinate axes depicted in FIG. 1. Rotation of the rear yoke 106 about the vehicle longitudinal axis L1 and each truck assembly 108 about the respective truck assembly axis L3 allows the outer wheel 110 and the inner wheel 112 to maintain continuous contact with the vehicle transit surface while in use.

The vehicle 100 includes a total of eight wheels, four outer wheels 110 and four inner wheels 112. As referred to herein, the outer wheel 110 is spaced apart from the vehicle longitudinal axis L1 by a first distance and the inner wheel 112 is spaced apart from the vehicle longitudinal axis L1 by a second distance less than the first distance. Stated another way, the inner wheels 112 are located closer to the vehicle longitudinal axis L1 than the outer wheels 110. As shown in FIG. 1, the outer wheel 110 and the inner wheel 112 of each truck assembly 108 is illustrated as an omnidirectional wheel and, specifically, a Mecanum wheel. However, it should be understood that, in embodiments, only one of the outer wheel 110 and the inner wheel 112 may be an omnidirectional wheel and, more specifically, a Mecanum wheel. As used herein, the term "omnidirectional wheel" refers to wheels with small discs or rollers provided around a circumference which is non-parallel to a turning direction of the wheel. This allows the wheel to be driven with full force, but also slide at an angle relative to the driving direction. As referred to herein, the outer wheels 110 will be referred to as the omnidirectional wheels, such as Mecanum wheels, while the inner wheels 112 may be either omnidirectional wheels, such as Mecanum wheels, or any other suitable unidirectional wheel or rolling device. In embodiments, in which only the outer wheel 110 is an omnidirectional wheel, the outer wheel 110 of each truck assembly 108 is an omnidirectional wheel. Alternatively, in embodiments in which only the inner wheel 112 is an omnidirectional wheel, the inner wheel 112 of each truck assembly 108 is an omnidirectional wheel. Providing both an outer wheel 110 and an inner wheel 112 for each truck assembly 108 increases the load carrying capacity of the vehicle 100 as compared to vehicles including only four wheels. As noted above, utilizing four omnidirectional wheels, for example, Mecanum wheels, as the outer wheels 110 allows the vehicle 100 to move in any direction by independently controlling the direction of rotation of the outer wheels 110. However, rotating each of the inner wheels 112 along with the outer wheels 110 results in increased friction against the vehicle transit surface and increased wear on the wheels 110, 112, thereby reducing the overall life of the wheels 110, 112. Accordingly, the vehicle 100 is configured to decouple the inner wheels 112 of each truck assembly 108 when moving in any direction other than a vehicle forward direction or a vehicle rearward direction parallel to the vehicle longitudinal axis L1, such as when the vehicle 100 is performing a rotation maneuver or a sideways maneuver, thereby permitting the outer wheels 110 to execute the omnidirectional movements.

Operation of the truck assemblies 108 may result in pushing and pulling forces being applied at opposite ends of the front yoke 104 and the rear yoke 106 relative to the frame 102 of the vehicle 100. As such, to prevent damage to the vehicle 100 and unintended movement at the front yoke 104 and the rear yoke 106 relative to the frame 102, the vehicle 100 may include a linkage assembly 148 coupling the front yoke 104 and the rear yoke 106 to the frame 102. In embodiments, as shown in FIGS. 1 and 4, the linkage assembly 148 may include a plurality of tie rods 150 coupling the rear yoke 106 to the frame 102, specifically the first side rail 120 and the second side rail 122. Although only a first pair of tie rods 150 are shown in FIG. 1 extending between an end of the rear yoke 106 and the first side rail 120, it should be appreciated that a second pair of tie rods 150 may similarly be provided to extend between an opposite end of the rear yoke 106 and the second side rail 122. As such, the pair of tie rods 150 extending along the first side rail 120 and the pair of tie rods 150 extending along the second side rail 122 coupling the frame 102 to the rear yoke 106 forms a linkage assembly 148. In embodiments, a similar linkage assembly 148 may be provided to couple the first side rail 120 and the second side rail 122 to the front yoke 104 as well.

Figure 2:
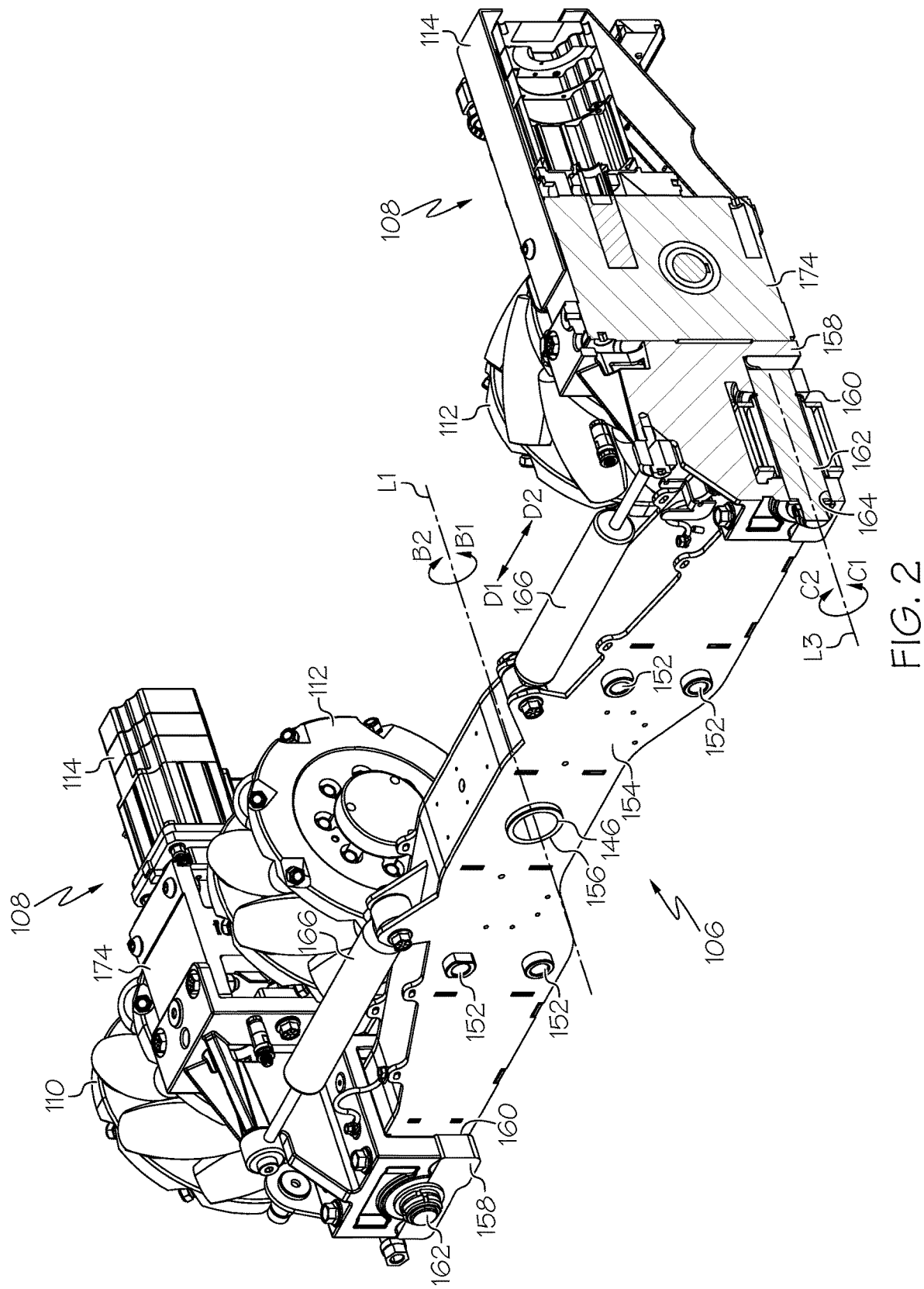
FIG. 2 schematically depicts a perspective view of a rear yoke and a pair of truck assemblies of the vehicle of FIG. 1, according to one or more embodiments shown and described herein.

Referring now to FIG. 2, the rear yoke 106 is illustrated. It should be appreciated that the rear yoke 106 and the front yoke 104 are identical in structure. Because the rear yoke 106 and the front yoke 104 are identical in structure, a plurality of mounting holes 152 may be provided on a frame facing surface 154 of the rear yoke 106 and configured to receive respective mounting shafts. Accordingly, the mounting shafts may be provided in the mounting holes 152 of the front yoke 104 to fixedly mount the front yoke 104 to the front rail 116 of the frame 102. For the rear yoke 106, the mounting holes 152 may not be utilized. Additionally, the rear yoke 106 includes a central aperture 156 formed in the frame facing surface 154 of the rear yoke 106. The central aperture 156 is configured to receive the rear yoke pivot 146 (FIG. 1) and rotatably couple the rear yoke 106 to the rear housing 142 (FIG. 1). Because the rear yoke 106 and the front yoke 104 are identical in structure, the front yoke 104 may also include a central aperture formed therein, but may not utilized as the front yoke 104 is not rotatably coupled to the front rail 116. The rear yoke pivot 146 rotatably couples the rear yoke 106 to the rear housing 142 such that the rear yoke 106 is permitted to rotate about the vehicle longitudinal axis L1 in the direction of arrow B1 and arrow B2. By permitting the rear yoke 106 to rotate relative to the rear rail 118 of the frame 102 of the vehicle 100, the relative height positions of the truck assemblies 108 provided at opposite ends of the rear yoke 106 are adjusted so that the outer wheel 110 and the inner wheel 112 of each truck assembly 108 are able to maintain continuous contact with the vehicle transit surface.

Referring still to FIG. 2, a cross-section view of one of the truck assemblies 108 mounted onto the rear yoke 106 is shown. In embodiments, the truck assembly 108 has a yoke receptacle 158 defining a receptacle cavity 160 through which the rear yoke 106 extends. The truck assembly 108 includes a truck assembly shaft 162 rotatably coupling the truck assembly 108 to the rear yoke 106. In embodiments, the truck assembly shaft 162 may be received within and fixed to a truck bore 164 formed in the truck assembly 108. Additionally, the truck assembly shaft 162 extends through a portion of the rear yoke 106 that is received within the yoke receptacle 158 of the truck assembly 108. Thus, as discussed herein, the truck assembly shaft 162 permits rotation of the truck assembly 108 in the direction of arrow C1 and arrow C2 about the truck assembly axis L3.

The rear yoke 106 may include a first pair of dampers 166 extending between the rear yoke 106 and a respective truck assembly 108. The dampers 166 are configured to provide a biasing force to cause the truck assemblies 108 to return from a rotated position to an initial position. For example, when the truck assembly 108 rotates about the truck assembly shaft 162 in the direction of arrow C1, the respective damper 166 will apply a biasing force in the direction of arrow D1 to return the truck assembly 108 to the initial position. Alternatively, when the truck assembly 108 rotates about the truck assembly shaft 162 in the direction of arrow C2, the respective damper 166 will apply a biasing force in the direction of arrow D2 to return the truck assembly 108 to the initial position.

Although not shown, it should be appreciated that the truck assemblies 108 at the front yoke 104 are mounted to the front yoke 104 in the same manner utilizing a similar truck assembly shaft. Similarly, as shown in FIG. 1, a second pair of dampers 166 is also provided at the front yoke 104 for assisting the truck assemblies 108 to return to an initial position.

Figure 3:
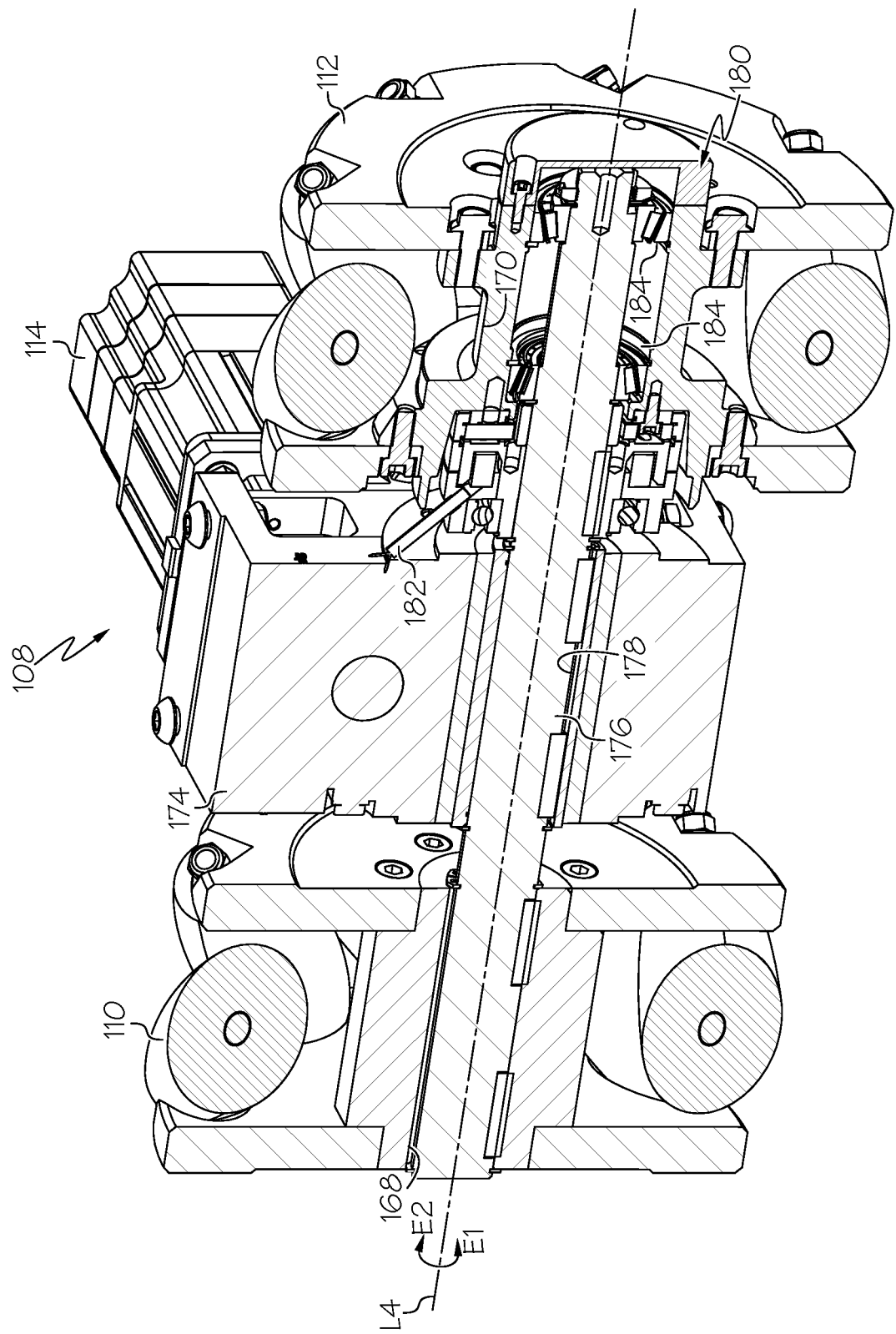
FIG. 3 schematically depicts a cross-section view of a truck assembly of the pair of truck assemblies of FIG. 2, according to one or more embodiments shown and described herein.

Referring now to FIG. 3, a cross-section view of a truck assembly 108 is illustrated. Each truck assembly 108 is identical in structure. As discussed herein, the truck assembly 108 includes the outer wheel 110 and the inner wheel 112. The outer wheel 110 includes an outer wheel bore 168, and the inner wheel 112 includes an inner wheel bore 170. The truck assembly 108 further includes the motor 114, a gearbox 174, and a truck axle 176 extending through a gearbox bore 178 formed in the gearbox 174. The motor 114 is communicatively coupled to the gearbox 174 to rotate the truck axle 176 in the directions of either arrow E1 or arrow E2 about a truck axle axis L4 extending transverse to the vehicle longitudinal axis (FIG. 1). In embodiments, the outer wheel 110 is fixed to the truck axle 176 such that operation of the motor 114 in a first state rotates the truck axle 176 in the direction of arrow E1 and similar rotates the outer wheel 110 in the same direction. Alternatively, the motor 114 may be operated in a second state to rotate the truck axle 176 and the outer wheel 110 in the direction of arrow E2.

In embodiments, the inner wheel 112 is selectively fixed to the truck axle 176 such that the inner wheel 112 may be configured to rotate with the outer wheel 110 in the same direction. More particularly, the truck assembly 108 includes a clutch 180 operatively coupled to the inner wheel 112 and operable between a coupled position and a decoupled position and provided within the inner wheel 112. When the clutch 180 is in the coupled position, the inner wheel 112 engages or becomes rotatably fixed to the truck axle 176 such that rotation of the truck axle 176 causes the inner wheel 112 to rotate in the same direction. Alternatively, when the clutch 180 is in the decoupled position, the inner wheel 112 disengages the truck axle 176 such that the truck axle 176 may rotate within the inner wheel bore 170 of the inner wheel 112 without causing the inner wheel 112 to rotate. It should be appreciated that any controllable clutch may be suitable for coupling and decoupling the inner wheel 112 to the truck axle 176.

In embodiments, the clutch 180 is an electromagnetic clutch including a terminal 182. In embodiments, when a voltage is applied to the terminal 182, the clutch 180 is positioned into either the coupled position or the decoupled position. In embodiments, the clutch 180 may include a pair of toothed members 184 for coupling the inner wheel 112 to the truck axle 176. Upon being actuated, the toothed members 184 may be configured to translate along the truck axle axis L4 to engage or disengage various parts of the truck axle 176 and/or the inner wheel 112. For example, the toothed members 184 may be configured to slide along the truck axle axis L4 in the direction of either arrow F1 or arrow F2 to engage or disengage various parts of the truck axle 176 and/or the inner wheel 112. In some embodiments, the toothed members 184 may be configured to move in the same direction such as in the direction of arrow F1 or arrow F2. In other embodiments, the toothed members 184 may be configured to move in opposite directions relative to one another when alternating between the coupled position and the decoupled position.

Although reference is made herein to the outer wheel 110 being fixed to the truck axle 176 and the inner wheel 112 being configured to engage and disengage the truck axle 176, it should be appreciated that, in embodiments, the inner wheel 111 is configured to engage and disengage the truck axle 176 while the outer wheel 110 remains fixed to the truck axle 176. In such an embodiment, the clutch 180 is positioned within the inner wheel 112 and configured to operate between the coupled position and the decoupled position to engage and disengage the truck axle 176 such that the inner wheel 112 is configured to freely rotate relative to the truck axle 176 when the clutch 180 is in the decoupled position. In other embodiments, the clutch 180 may be positioned outside of the inner wheel 112.

Referring now to FIG. 4, the vehicle 100 is illustrated with one of the lifting devices 130 of the lifting assembly 128 in the raised position and engaging an object such as, for example, a platform 186. As shown in FIG. 4, the vehicle 100 is positioned under the platform 186, such as by operating the truck assemblies 108 to maneuver the vehicle 100 to be located under the platform 186. In embodiments, the platform 186 may be utilized to support objects such as, for example, additional vehicles, equipment, storage units, and the like. Once the vehicle 100 is determined to be in position under the platform 186, the lifting assembly 128 is operated to cause each of the lifting devices 130 to move from the lowered position into the raised position and engage the platform 186. In embodiments, each lifting device 130 of the lifting assembly 128 may include a roller 188 extending between the distal end 140 of the lifting device 130 and a respective one of the first side rail 120 and the second side rail 122. As the roller 188 is operated to extend from the first side rail 120 or the second side rail 122, the lifting device 130 is configured to pivot at the lifting pivot 136 extending through the proximal end 134 of the lifting device 130, as shown in FIG. 1. Pivoting of the lifting device 130 causes the lifting device 130 to be positioned within the raised position and contact the platform 186.

Figure 5:
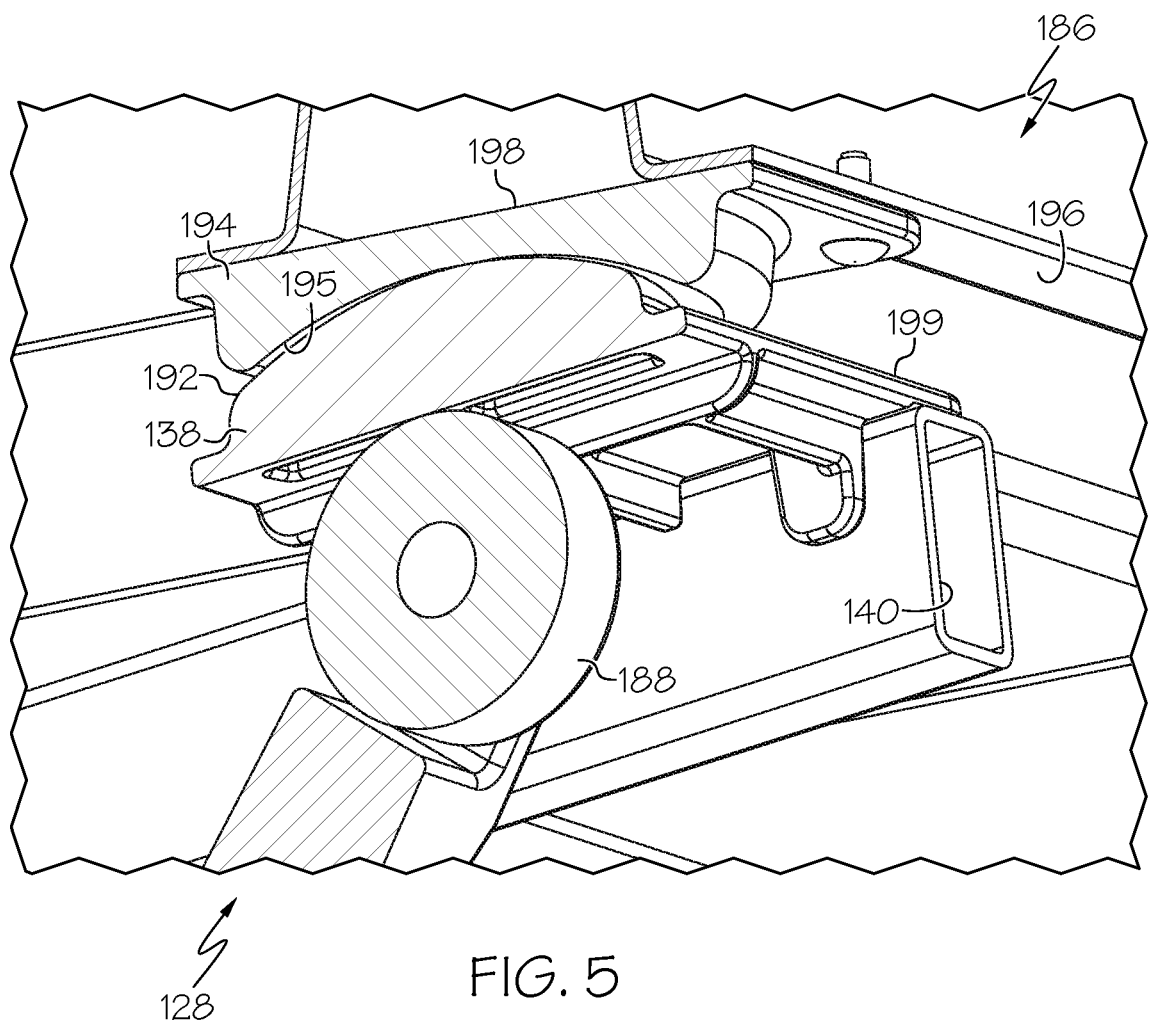
FIG. 5 schematically depicts an enlarged perspective view of the lifting device of FIG. 4 engaging the platform, according to one or more embodiments shown and described herein.

More specifically, the each lifting device 130 includes the contact member 138 provided at the distal end 140 of the lifting device 130. In embodiments, the contact member 138 has a convex outer surface 192 extending in a direction opposite the respective one of the first side rail 120 and the second side rail 122. The contact member 138 may be configured to engage a receiving member of the platform 186. For example, as shown in FIG. 5, the platform 186 includes a receiving member 194 fixed to a bottom surface 196 of the platform 186. The receiving member 194 has a planar surface 198 facing the bottom surface 196 of the platform 186 and a concave outer surface 195 opposite the planar surface 198. As such, the receiving member 194 is shaped to receive the contact member 138 of the lifting device 130, specifically the convex outer surface 192. The contact member 138 may be integrally formed on an upper surface 199 of the distal end 140 of the lifting device 130. Accordingly, as shown in FIG. 5, the roller 188 may positioned to be received within the distal end 140 of the lifting device 130 underneath the contact member 138 so as to apply a force on the distal end 140 of the lifting device 130.

As the force is applied to the distal end 140 of the lifting device 130 by the roller 188, the lifting device 130 moves toward the raised position so that the contact member 138 of the lifting device 130 is received within the receiving member 194 of the platform 186. It should be appreciated that the platform 186 includes a plurality of receiving members 194 with each receiving member 194 located to engage a respective contact member 138 when the lifting devices 130 are each in the raised position. As such, the platform 186 may be supported at four locations when positioned over the vehicle 100. The platform 186 may then be raised by the vehicle 100 and transported along with the vehicle 100 to a target destination. In embodiments, it should be appreciated that the contact member 138 may alternatively include a concave outer surface and the receiving member 194 may have a convex outer surface so as to receive the contact member 138. In addition, alternative engagements between the contact member 138 and the receiving member 194 are within the scope of the present disclosure such as, for example, engagement by way of locking mechanisms, magnetic interfaces, and the like.

Referring now to FIG. 6, a vehicle system 200 may be provided for operating the various components of the vehicle 100, for example, the truck assemblies 108 to couple and decouple the inner wheel 112 and position the vehicle 100, and the lifting assembly 128 to position the lifting devices 130 between the raised position and the lowered position. The vehicle system 200 may comprise a controller 202, a power supply 204, a sensing device 206, the truck assemblies 108, the lifting assembly 128, network interface hardware 208, and a communication path 210 communicatively coupled these components.

The controller 202 may comprise a processor 212 and a non-transitory electronic memory 214 to which various components are communicatively coupled. In some embodiments, the processor 212 and the non-transitory electronic memory 214 and/or the other components are included within a single device. In other embodiments, the processor 212 and the non-transitory electronic memory 214 and/or the other components may be distributed among multiple devices that are communicatively coupled. The controller 202 may include non-transitory electronic memory 214 that stores a set of machine-readable instructions. The processor 212 may execute the machine-readable instructions stored in the non-transitory electronic memory 214. The non-transitory electronic memory 214 may comprise RAM, ROM, flash memories, hard drives, or any device capable of storing machine-readable instructions such that the machine-readable instructions can be accessed by the processor 212. Accordingly, the vehicle system 200 described herein may be implemented in any computer programming language, as pre-programmed hardware elements, or as a combination of hardware and software components. The non-transitory electronic memory 214 may be implemented as one memory module or a plurality of memory modules.

In some embodiments, the non-transitory electronic memory 214 includes instructions for executing the functions of the vehicle system 200. The instructions may include instructions for operating the motor 114 of one or more of the truck assemblies 108 in either the first state or the second state, positioning the clutch 180 of the truck assemblies 108 between the coupled state and the decoupled state to couple or decouple the inner wheel 112 of each of the truck assemblies 108 to the truck axle 176, positioning the lifting devices 130 between the raised state and the lowered state, and the like. More particularly, the instructions may include automatically positioning the clutch 180 of the truck assemblies 108 into the decoupled state when the vehicle 100 is moving or instructed to move in any direction other that in the vehicle longitudinal direction.

The processor 212 may be any device capable of executing machine-readable instructions. For example, the processor 212 may be an integrated circuit, a microchip, a computer, or any other computing device. The non-transitory electronic memory 214 and the processor 212 are coupled to the communication path 210 that provides signal interconnectivity between various components and/or modules of the vehicle system 200. Accordingly, the communication path 210 may communicatively couple any number of processors with one another, and allow the modules coupled to the communication path 210 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 6, the communication path 210 communicatively couples the processor 212 and the non-transitory electronic memory 214 of the controller 202 with a plurality of other components of the vehicle system 200. For example, the vehicle system 200 depicted in FIG. 6 includes the processor 212 and the non-transitory electronic memory 214 communicatively coupled with the power supply 204, the sensing device 206, the truck assemblies 108, and the lifting assembly 128.

The power supply 204 (e.g., battery) provides power to the various components of the vehicle 100 such as, for example, the sensing device 206, the truck assemblies 108, and the lifting assembly 128. In some embodiments, the power supply 204 is a rechargeable direct current power supply. It is to be understood that the power supply 204 may be a single power supply or battery for providing power to the sensing device 206, the truck assemblies 108, and the lifting assembly 128.

The sensing device 206 is configured to detect a surrounding environment of the vehicle 100 to identify a location of the vehicle 100. The sensing device 206 may include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more Light Detection and Ranging (LIDAR) sensors, radar sensors, sonar sensors, or other types of sensors and that such data could be integrated into or supplement the data collection described herein. Ranging sensors like radar may be used to obtain a rough depth and speed information of an object. In embodiments, the vehicle 100 may include a plurality of sensing devices 206 arranged at various locations of the vehicle 100 such as, for example, at the front rail 116, the rear rail 118, the first side rail 120, and the second side rail 122. The vehicle 100 may also include one or more sensing devices 206 located at a bottom surface of the vehicle 100 so as to detect a surface over which the vehicle 100 moves along. The sensing device 206 may be configured to identify when the vehicle 100 is in position relative to an object, such as the platform 186, and, when in the correct position, activate the lifting assembly 128 to contact and engage the platform 186.

In some embodiments, the vehicle system 200 includes network interface hardware 208 for communicatively coupling the vehicle system 200 to a portable device 216 via a network 218. The portable device 216 may include, without limitation, a smartphone, a tablet, a personal media player, or any other electric device that includes wireless communication functionality. The portable device 216 is capable of communicating with the network interface hardware 208, utilizing Wi-Fi, Bluetooth, and/or any other suitable communication protocol. It is to be appreciated that, when provided, the portable device 216 may serve to wirelessly provide user commands to the controller 202. As such, a user may be able to control or set a program for controlling the vehicle 100. Thus, the vehicle 100 may be controlled remotely via the portable device 216 wirelessly communicating with the controller 202 via the network 218.

From the above, it is to be appreciated that defined herein is an omnidirectional vehicle including a plurality of truck assemblies. Each truck assembly includes an outer wheel, an inner wheel, and a clutch configured to selectively decouple one of the outer wheel and the inner wheel when moving the vehicle in a non-vehicle longitudinal direction. By decoupling one of the wheels of each truck assembly, the decoupled wheel is able to freely rotate relative to the other wheel.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a plurality of truck assemblies, each truck assembly comprising:
      a truck axle;
      a first wheel fixed to the truck axle;
      a second wheel selectively coupled to the truck axle;
      a motor configured to rotate the truck axle; and
      a clutch operatively coupled to second wheel, the clutch being positionable between a coupled position and a decoupled position;
   a frame comprising a front rail, a rear rail, and a first side rail extending between the front rail and the rear rail;
   a rear yoke rotatably coupled to the rear rail and rotatable relative to the rear rail about a vehicle longitudinal axis; and
   a linkage assembly extending between the rear yoke and the plurality of truck assemblies mounted to the rear yoke, the linkage assembly comprising:
      a first pair of tie rods extending between the first side rail and a first end of the rear yoke; and
      a second pair of tie rods extending between the first side rail and a second end of the rear yoke,
   wherein when the clutch is in the coupled position, the second wheel rotates with the truck axle, and when the clutch is in the decoupled position, the second wheel is free to rotate relative to the truck axle.

2. The vehicle of claim 1, wherein:
   the frame further comprises:
      a second side rail extending between the front rail and the rear rail, and
      a front yoke fixed to the front rail.

3. The vehicle of claim 2, wherein the first wheel is spaced apart from the vehicle longitudinal axis by a first distance and the second wheel is spaced apart from the vehicle longitudinal axis by a second distance less than the first distance.

4. The vehicle of claim 3, wherein the second wheel of each truck assembly of the plurality of truck assemblies is an omnidirectional wheel.

5. The vehicle of claim 2, wherein each truck assembly of the plurality of truck assemblies are rotatably coupled at opposite ends of each of the front yoke and the rear yoke to rotate between an initial position and a rotated position.

6. The vehicle of claim 5, wherein the front yoke includes a front pair of dampers extending between the front yoke and a respective truck assembly, and the rear yoke includes a rear pair of dampers extending between the rear yoke and a respective truck assembly, the front pair of dampers and the rear pair of dampers providing a biasing force to return the truck assemblies to the initial position from the rotated position.

7. The vehicle of claim 2, further comprising a lifting assembly including a plurality of lifting devices positionable between a lowered position and a raised position,
   wherein when in the lowered position, each of the plurality of lifting devices are positioned along an upper surface of one of the first side rail and the second side rail, and
   wherein when in the raised position, each of the plurality of lifting devices are pivoted at a proximal end of the plurality of lifting devices.

8. The vehicle of claim 7, wherein each lifting device of the plurality of lifting devices includes a contact member provided at a distal end opposite the proximal end for engaging a receiving member of a platform when the vehicle is positioned under the platform.

9. The vehicle of claim 1, wherein the first wheel of each truck assembly of the plurality of truck assemblies is an omnidirectional wheel.

10. The vehicle of claim 9, wherein the second wheel of each truck assembly of the plurality of truck assemblies is an omnidirectional wheel.

11. A method comprising:
   receiving, at a vehicle, a first instruction to perform a first maneuver, the first maneuver including moving the vehicle in a vehicle longitudinal direction, the vehicle comprising:
      a plurality of truck assemblies, each truck assembly comprising:
         a truck axle;
         a first wheel fixed to the truck axle;
         a second wheel selectively coupled to the truck axle;
         a motor configured to rotate the truck axle; and
         a clutch operatively coupled to the second wheel, the clutch being positionable between a coupled position to rotate the second wheel with the truck axle, and a decoupled position to permit the truck axle to rotate without rotating the second wheel;
      a frame comprising a front rail, a rear rail, and a first side rail extending between the front rail and the rear rail;
      a rear yoke rotatably coupled to the rear rail and rotatable relative to the rear rail about a vehicle longitudinal axis; and
      a linkage assembly extending between the rear yoke and the plurality of truck assemblies mounted to the rear yoke, the linkage assembly comprising:
         a first pair of tie rods extending between the first side rail and a first end of the rear yoke; and
         a second pair of tie rods extending between the first side rail and a second end of the rear yoke,
   in response to receiving the first instruction, positioning the clutch into the coupled position;
   performing the first maneuver;
   receiving, at the vehicle, a second instruction to perform a second maneuver, the second maneuver including moving the vehicle in a non-vehicle longitudinal direction;
   in response to receiving the second instruction, positioning the clutch into the decoupled position; and
   performing the second maneuver.

12. The method of claim 11, wherein:
the first wheel is spaced apart from a vehicle longitudinal axis by a first distance and the second wheel is spaced apart from the vehicle longitudinal axis by a second distance less than the first distance; and
the first wheel and the second wheel of each truck assembly of the plurality of truck assemblies are omni-directional wheels.

13. A vehicle comprising:
a plurality of truck assemblies, each truck assembly comprising:
   a truck axle;
   a first wheel fixed to the truck axle;
   a second wheel selectively coupled to the truck axle;
   a motor configured to rotate the truck axle; and
   a clutch operatively coupled to second wheel, the clutch being positionable between a coupled position and a decoupled position;
a lifting assembly including a plurality of lifting devices positionable between a lowered position and a raised position,
wherein when in the raised position, each of the plurality of lifting devices are pivoted at a proximal end of the plurality of lifting devices,
wherein each lifting device of the plurality of lifting devices includes a contact member provided at a distal end opposite the proximal end for engaging a receiving member of a platform when the vehicle is positioned under the platform,
wherein when the clutch is in the coupled position, the second wheel rotates with the truck axle, and when the clutch is in the decoupled position, the second wheel is free to rotate relative to the truck axle.

* * * * *